(12) United States Patent
Lindén et al.

(10) Patent No.: US 7,089,625 B2
(45) Date of Patent: Aug. 15, 2006

(54) SHAFT OF A TOOL OR THE LIKE

(75) Inventors: Olavi Lindén, Billnäs (FI); Aaro Huttunen, Billnäs (FI)

(73) Assignee: Fiskars Consumer Oy Ab, Billnas (FI)

( * ) Notice: Subject to any disclaimer, the term of this patent is extended or adjusted under 35 U.S.C. 154(b) by 0 days.

(21) Appl. No.: 10/447,207

(22) Filed: May 28, 2003

(65) Prior Publication Data

US 2004/0018047 A1    Jan. 29, 2004

(30) Foreign Application Priority Data

May 28, 2002    (FI) .................................. 20020999

(51) Int. Cl.
B25G 1/04        (2006.01)

(52) U.S. Cl. .................... 16/110.1; 16/429; 16/405; 16/436

(58) Field of Classification Search ............ 16/110.1, 16/405, 422, 426, 427, 429, DIG. 41, 436; 15/144.3, 144.4; 81/177.2; 294/57, 24, 294/19.1, 19.2; 74/525, 546, 551.3–551.7; 403/109.1, 109.2, 348–350, 377
See application file for complete search history.

(56) References Cited

U.S. PATENT DOCUMENTS

| | | | | |
|---|---|---|---|---|
| 805,674 A * | 11/1905 | Senderling | ................ | 24/573.11 |
| 1,411,195 A | 3/1922 | Shingler | | |
| 4,277,197 A | 7/1981 | Bingham | | |
| 4,619,549 A * | 10/1986 | Gilbreth | ..................... | 403/349 |
| 4,653,142 A * | 3/1987 | Upton | ......................... | 16/429 |
| 4,836,706 A * | 6/1989 | Mitchell | ...................... | 403/24 |
| 4,949,809 A | 8/1990 | Levi et al. | | |
| 4,960,015 A * | 10/1990 | Mathews | .................... | 81/177.2 |
| 4,989,295 A * | 2/1991 | Guhne et al. | ................. | 15/410 |
| 5,460,458 A | 10/1995 | Caceres | | |
| 5,743,577 A * | 4/1998 | Newman et al. | ........... | 294/19.1 |
| 5,795,000 A | 8/1998 | Aldorasi | | |
| 5,803,643 A * | 9/1998 | Patelli et al. | ............ | 403/109.1 |
| 5,951,078 A | 9/1999 | Whitehead et al. | | |
| 6,250,839 B1 * | 6/2001 | Lenhart | ................... | 403/109.5 |
| 6,378,922 B1 | 4/2002 | Troudt | | |
| 6,490,761 B1 * | 12/2002 | Durrant | ....................... | 16/436 |
| 6,550,727 B1 * | 4/2003 | Butterfield et al. | ...... | 248/188.5 |
| 6,761,501 B1 * | 7/2004 | Nakatani | ................. | 403/109.5 |

FOREIGN PATENT DOCUMENTS

| | | |
|---|---|---|
| DE | A 3841254 | 6/1990 |
| DE | A 19617365 | 11/1996 |
| WO | WO 01/09522 A1 | 2/2001 |

* cited by examiner

Primary Examiner—Chuck Y. Mah
Assistant Examiner—Michael J. Kyle
(74) Attorney, Agent, or Firm—Foley & Lardner LLP

(57) ABSTRACT

The invention relates to a shaft of a tool or the like with an adjustable length, the shaft comprising a first shaft section (2) and a second shaft section (10) which are attached to each other by adjusting means and move telescopically with respect to each other when the shaft length is adjusted. In that case, the adjusting means for adjusting the shaft length comprise a sleeve (4) provided in the second shaft section (10) and an at least partly toothed spindle (6) provided in the first shaft section (2), the first end of the spindle being taken through the sleeve (4). The sleeve (4) and the spindle (6) attach the first (2) and the second (10) shaft section adjustably to each other so that the sleeve (4) and the spindle (6) can be turned with respect to each other into a position preventing the adjustment of the shaft length and into a position allowing the adjustment of the shaft length where the spindle (6) can move in the sleeve (4) in the longitudinal direction.

19 Claims, 4 Drawing Sheets

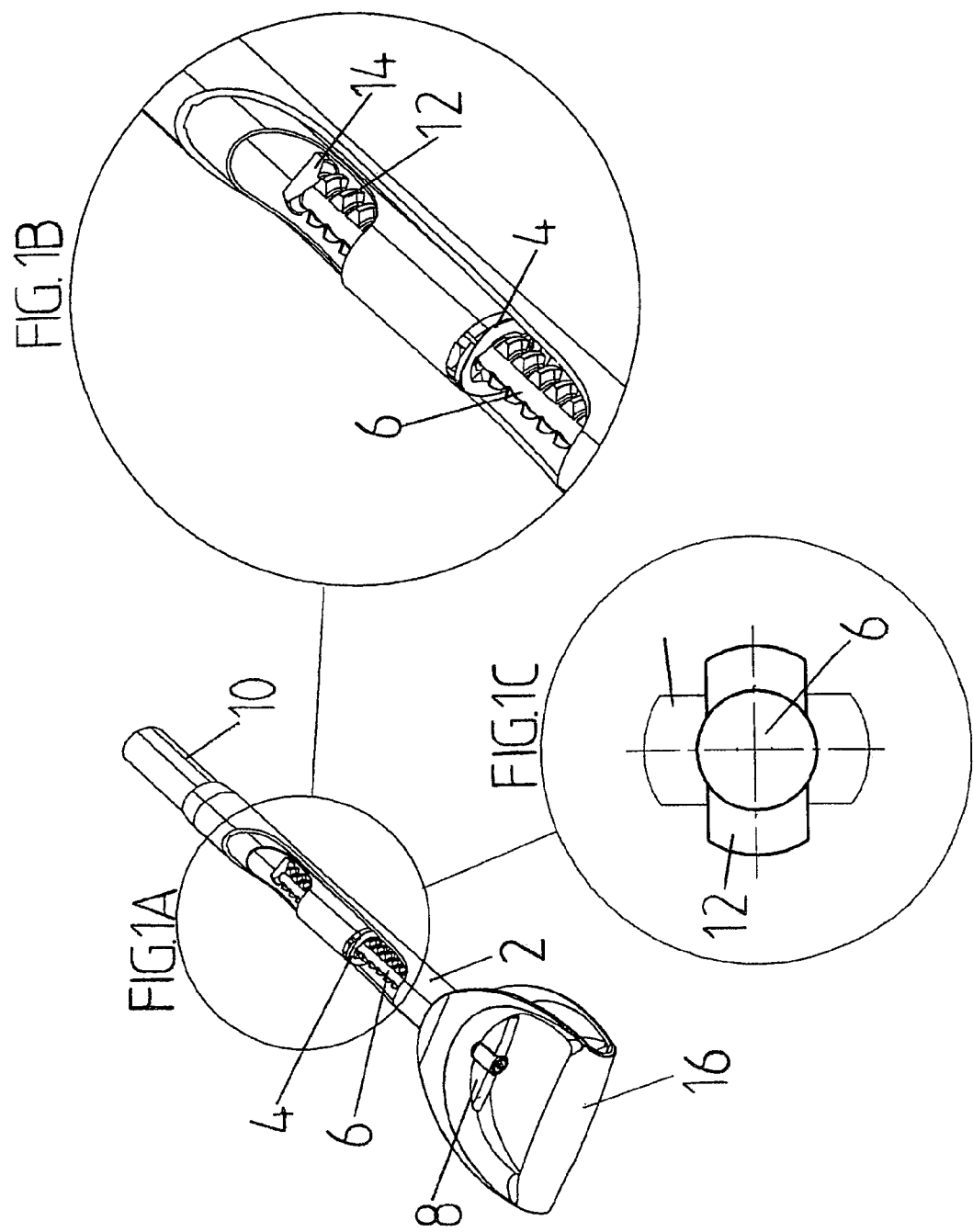

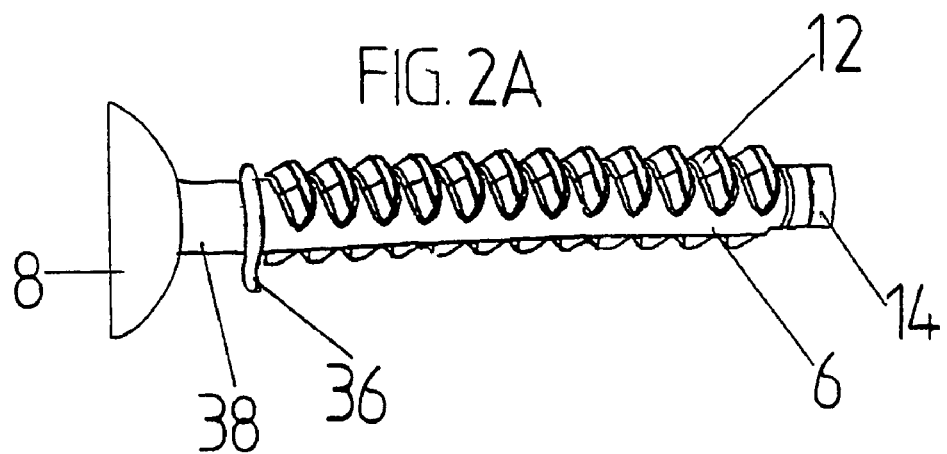
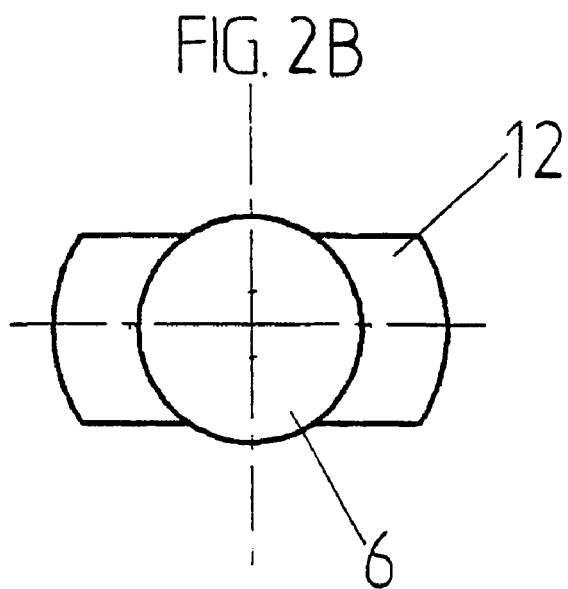

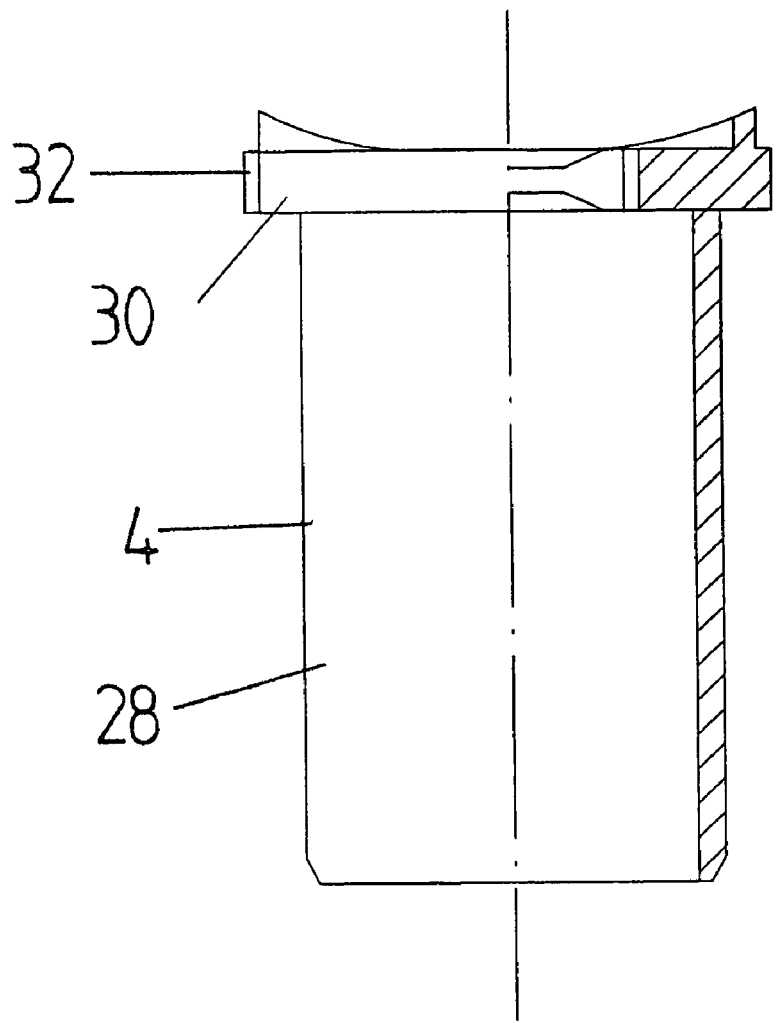
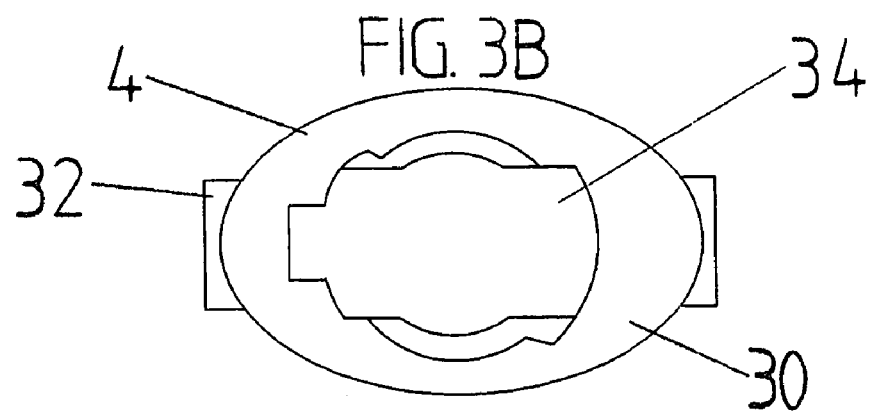

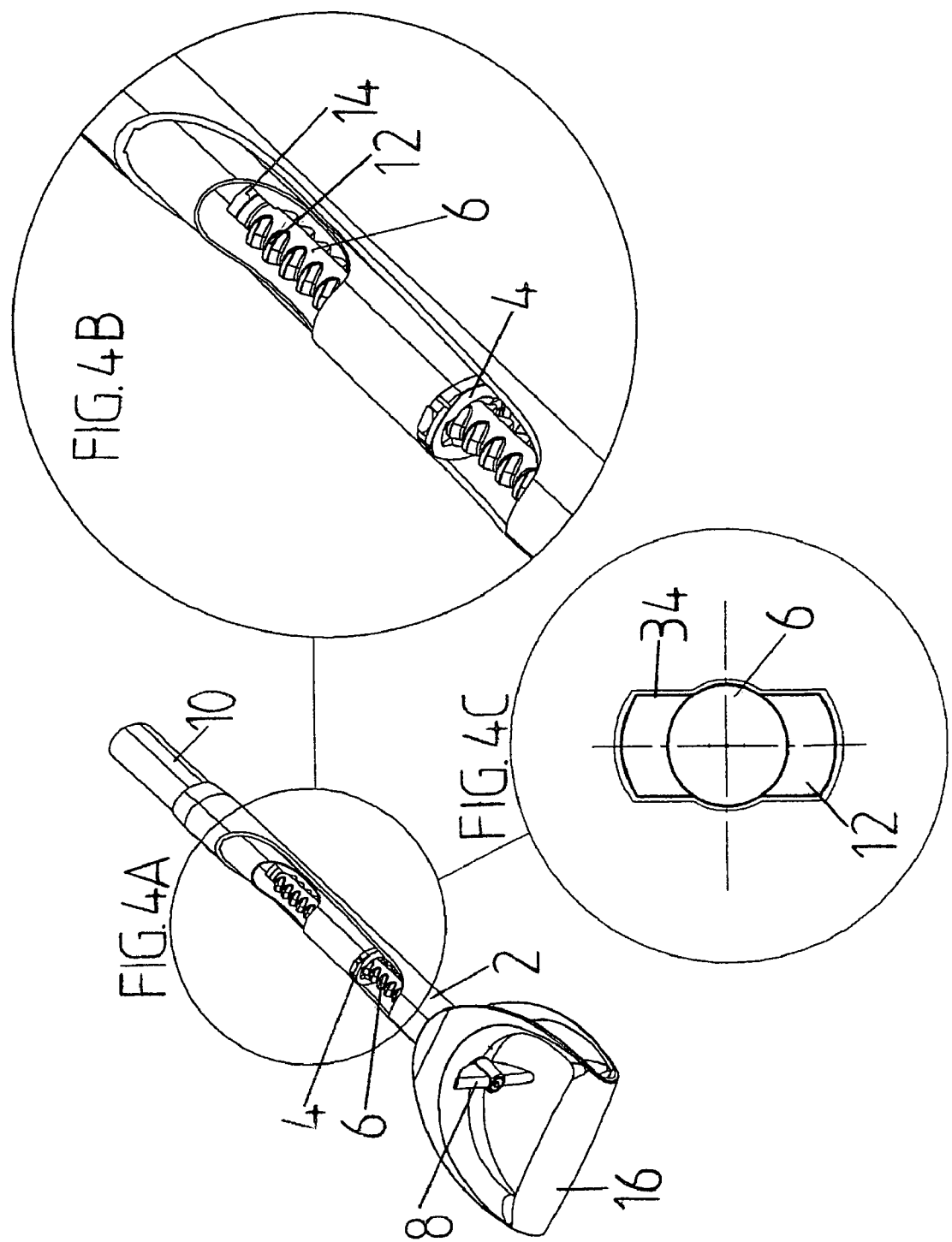

SHAFT OF A TOOL OR THE LIKE

BACKGROUND OF THE INVENTION

The invention relates to a shaft of a tool or the like according to the preamble of claim 1.

Tools provided with shafts are used in various spheres of life from work to hobbies. What is relevant to the function and use of equipment provided with long shafts is the length of their shafts. Different applications and users require different shaft lengths, and thus it is often advantageous to provide a tool with an adjustable shaft, which allows each user to adjust the shaft length to suit him/her and the application. The use of adjustable shafts in tools provided with long shafts is a prior art solution. Adjustable shafts are used, for example, in shovels, mops and crutches. Furthermore, sticks and poles with long shafts are used in various sports, such as floorball sticks, ski poles and Nordic walking poles which have an adjustable length. Adjustability of the shaft length allows the length of equipment to be adjusted according to each user and application, which facilitates carrying out of the task at hand. Traditionally, problems associated with the shaft length have been solved by interchangeable handles of different lengths or by mechanisms enabling the adjustment of the shaft length.

When the shaft length is adjusted by means of adjusting mechanisms, the sections of the shaft consisting of two separate sections move inside each other so that the tool shaft can be shortened by pushing one section of the shaft inside the other and lengthened by pulling the sections within each other apart in opposite directions. The shaft length can be adjusted and the shaft locked at the desired length by an adjusting mechanism which is provided in the shaft and by which the shaft sections can be locked into the desired position and released for the adjustment of the shaft length. An example of a mechanism for adjusting the length of a tool shaft is described in U.S. Pat. No. 1,411,195. The length of the shovel shaft described in this publication can be adjusted by a movable upper shaft. The upper shaft is partly provided inside a hollow tubular lower shaft, and it can be tightened to the desired position by a clamping band. An example of another adjusting mechanism based on friction is disclosed in U.S. Pat. No. 5,460,458. U.S. Pat. No. 5,795,000 describes an adjusting mechanism based on a spring pin arrangement where the outer shaft section is provided with appropriately spaced holes and the user arranges the spring pin provided in the inner shaft section in the desired hole when adjusting the length of the tool shaft.

A problem associated with the solutions described above is that adjusting mechanisms based on friction cannot usually hold the tool shaft in place sufficiently tightly during use or they loosen during use. Furthermore, such tools are often stored outside, and therefore the metal parts of the spring pin arrangement may rust and become useless.

SUMMARY OF THE INVENTION

The object of the invention is to provide an adjustable shaft for tools, hobby equipment or the like which solves the above-mentioned problems. For the sake of simplicity, only the term "tool shaft" will be used in the following description. The object of the invention is achieved by a shaft which is characterized by what is stated in independent claim 1. The preferred embodiments of the invention are disclosed in the dependent claims.

The problems described above are solvable by a tool shaft whose length is adjustable and which comprises a first shaft section and a second shaft section, which are attached to each other by adjusting means and which move telescopically with respect to each other when the shaft length is adjusted. The adjusting means for adjusting the shaft length comprise a sleeve provided in the first shaft section and an at least partly toothed spindle provided in the second shaft section, the first end of the spindle being taken through the sleeve. The sleeve and the spindle attach the first and the second shaft section adjustably to each other so that the sleeve and the spindle can be turned with respect to each other into a position where the adjustment of the shaft length is prevented and into a position allowing the adjustment of the shaft length where the spindle can move in the sleeve in the longitudinal direction.

The spindle toothing consists of cog pairs transverse to its longitudinal direction and the areas between the spinle cogs form a cog-free area. The opening provided in the sleeve is shaped so as to allow, when the spindle taken through it is turned around its longitudinal axis, locking of the tool shaft at the desired length by means of the opening provided in the sleeve and the spindle toothing or unlocking of the shaft for the adjustment of the shaft length. When the shaft length is adjusted, the spindle is turned around its longitudinal axis into a position where the spindle can move in the direction of its longitudinal axis in the opening provided in the sleeve. The shaft sections that are within each other are moved telescopically to achieve the desired shaft length. After the shaft length has been adjusted, the user of the tool can lock the shaft at the adjusted length by turning the spindle in the sleeve into a position where the spindle cannot move in the direction of its longitudinal axis.

An advantage of the system according to the invention is that the locking of the tool adjusting mechanism does not loosen during use, it is easily manageable by the user and the mechanism does not require metal parts, which may rust outside, but it can be made completely of plastic, for example.

BRIEF DESCRIPTION OF THE FIGURES

The invention will now be described in greater detail by means of preferred embodiments, with reference to the accompanying drawings, in which FIG. 1a is a partly sectional view of an adjusting shaft according to an embodiment of the invention, the adjusting mechanism of the shaft being in the position preventing the adjustment of the tool length.

FIG. 1b illustrates the adjusting mechanism of the adjusting shaft of FIG. 1a in greater detail when it is in the locked position.

FIG. 1c illustrates the position of the spindle and sleeve of the adjusting mechanism of FIG. 1a with respect to each other when the mechanism is in the locked position.

FIG. 2a illustrates a spindle according to an embodiment of the invention.

FIG. 2b is a cross-sectional view of the spindle of FIG. 2a.

FIG. 3a is a cross-sectional view of a sleeve according to an embodiment of the invention.

FIG. 3b is a top view of the sleeve of FIG. 3a.

FIG. 4a is a partly sectional view of the adjusting shaft of FIG. 1a whose adjusting mechanism is in the position allowing the adjustment of the shaft length.

FIG. 4b illustrates the adjusting mechanism of the tool of FIG. 4a in greater detail in the adjustment position.

FIG. 4c illustrates the position of the spindle and sleeve of the adjusting mechanism of FIG. 4a with respect to each other in the adjustment position of the shaft.

DETAILED DESCRIPTION OF THE INVENTION

FIG. 1a illustrates a tool shaft with an adjustable length according to an embodiment of the present invention. The shaft comprises a first shaft section and a second shaft section, which are attached to each other by adjusting means and which move telescopically with respect to each other when the shaft length is adjusted. The adjusting means for adjusting the shaft length comprise a sleeve 4 provided in the second shaft section 10 and an at least partly toothed spindle 6 provided in the first shaft section 2, the first end of the spindle being taken through the sleeve 4. The sleeve 4 and the spindle 6 attach the first 2 and the second 10 shaft section adjustably to each other so that the sleeve 4 and the spindle 6 can be turned with respect to each other into a position preventing the adjustment of the shaft length and into a position allowing the adjustment of the shaft length where the spindle 6 can move in the sleeve in the longitudinal direction. The tool used in this embodiment may be a shovel or a fork, for example.

In the solution exemplified in FIG. 1a, the outer 2 shaft section is attached to the outer 10 shaft section by adjusting means to allow the shaft sections to move telescopically within each other, thus enabling the adjustment of the shaft length. In that case, the inner shaft section 10 is shaped so as to allow it to move within the outer shaft section 2. In the embodiment of FIG. 1a, the outer shaft section 2 is attached to a handle 16 and the inner shaft section is attached to a tool portion (not shown) provided at the other end of the shaft. The adjustable shaft according to the invention can also be implemented such that the shaft section attached to the handle or the like corresponds to the inner section and slides inside the outer shaft section to be attached to the tool portion when the shaft length is being adjusted. In this embodiment, the shaft sections are provided with an elliptical cross section to increase the stiffness of the shaft in its presumed bending direction and to prevent the outer and the inner shaft section from turning with respect to each other.

To adjust the tool shaft length and lock the shaft into the desired position, an adjusting mechanism is attached to the shaft in accordance with FIG. 1a, the mechanism comprising a spindle 6 attached to the outer shaft part 2 and a sleeve 4 formed in or attached to the inner shaft section 10. The spindle is taken through the sleeve as shown in FIG. 1b. The size and shape of the elongated spindle 6 are such that the spindle can move inside both shaft parts. The body of the spindle 6 is provided with cogs 12 which project from the spindle body in the transverse direction to the longitudinal axis of the spindle 6 as shown in FIGS. 2a and 2b. The cogs 12 are formed such that the cogs project from the spindle 6 in pairs in opposite directions, in which case the cogs on the opposite sides of the spindle body match. The cogs arranged in this way are positioned one after the other in the longitudinal direction of the spindle 6. They thus form two longitudinal toothing zones on the opposite sides of the spindle, and the areas between the rows of the cogs on the opposite sides form a cog-free zone, as appears from the cross-sectional view of the spindle 6 shown in FIG. 2b.

FIGS. 3a and 3b illustrate a sleeve 4 according to the invention. The sleeve 4 according to this embodiment comprises a case portion 28 and a flange 30. FIG. 3b shows an opening 34 which is provided in the sleeve flange and through which the spindle 6 is taken. The opening 34 is shaped according to the cross section of the spindle so that when the spindle 6 is in the transverse position with respect to the sleeve opening as shown in FIGS. 1a to 1c, cogs 12 tightened onto both sides of the flange 30 prevent the outer 2 and the inner 10 shaft section from moving telescopically with respect to each other. When the spindle 6 is turned from the locking position described above into the adjustment position of FIGS. 4a to c, the spindle 6 can move to and from in the sleeve 4 opening 34, in which case the shaft length can be adjusted by pulling the shaft sections 2 and 10 in opposite directions or by pushing them inside each other.

The thickness of the edges of the opening 34 in the flange 30 approximately corresponds to the distance between the successive cogs 12 on the same side of the spindle 6. Consequently, the flange will stay tightly between successive cog pairs when the spindle 6 is in the locked position according to FIGS. 1a to c, in which case the upper and the lower surface of the flange 30 are pressed between successive cog pairs. Both the spindle 6 cogs 12 and the edges of the sleeve 4 opening 34 are bevelled or wedge-shaped so that when the spindle 6 is turned into the locking position, the edges of the opening 34 are wedged between successive cog pairs, thus sealing the spindle 6 with the sleeve 4 to provide a tight joint. The bevelled surfaces also function as guides when the spindle 6 is turned in the opening 34, in which case the wedge-like cogs 12 and the edges of the opening 34 enable smooth turning of the spindle 6 in the opening 34 and guide the edge of the opening 34 between successive cog pairs.

In this embodiment, the sleeve 4 is attached to the end of the inner shaft section 10 closest to the outer shaft section 2 as shown in FIGS. 1a to b and 4a to b and shaped to allow the case portion 28 of the sleeve to fit tightly inside the inner shaft section 10. The case portion 28 of the sleeve is preferably hollow and the wall thickness of the flange portion is selected to allow the spindle 6 to turn inside the sleeve without difficulty. In the embodiment shown in the figures, the cross section of the shaft and thus that of the sleeve is elliptical, but the cross section may also be circular, polygonal or of any shape suitable for the application of the tool in question.

In the embodiment shown in FIG. 3a, the size and shape of the flange 30 provided in the sleeve 4 are such that it fits inside the outer shaft section 2 but not inside the inner shaft section 10. When the case portion 28 of the sleeve 4 is inside the inner shaft section 10, the lower surface of the sleeve 4 flange 30 is against the end edge of the inner shaft section 10 as shown in FIG. 1b, preventing the sleeve from sliding too deep inside the inner shaft section 10. The sleeve 4 can also be attached to the inner shaft section by an adhesive, a mechanical locking mechanism or the like so as to prevent it from moving when the shaft length of the tool is adjusted. The sleeve 4 shaped this way will stay in place in the inner shaft section 10 but can move in the longitudinal direction inside the outer shaft section 2 when the shaft length is adjusted.

According to FIGS. 3a and 3b, two guides 32 are formed on the opposite sides of the edge of the elliptical flange 30. The guides occupy the grooves provided on the inner surface of the outer shaft section 2, preventing the outer 2 and the inner 10 shaft section from turning with respect to each other and facilitating the movement of the shaft sections when the shaft length is adjusted and the shaft is used in the locked position.

The spindle 6 can also be provided with a few additional properties to facilitate the shaft length adjustment. As shown in FIGS. 1b, 2a and 4b, a cog pair 14 is provided at the first end of the spindle 6 towards the sleeve 4. This cog pair provided at the end has slightly turned around the longitudinal axis of the spindle with respect to the other cog pairs.

The purpose of the cog pair provided at the end is to function as a stopper, which prevents the spindle 6 from sliding completely through the opening 34 in the sleeve 4 when the tool shaft length is adjusted by pulling the shaft sections apart from each other in the longitudinal direction. However, the cog pair at the end may be shaped so as to allow detachment of the spindle 6 from the sleeve 4, if desired. The stopper can also be shaped into an end flange of another kind which prevents the spindle from sliding completely out of the sleeve and simultaneously defines one of the extreme positions of the adjustment and the maximal length of the shaft.

The adjusting means for adjusting the shaft length may further comprise a locking member 8 for turning the sleeve 4 and the spindle 6 with respect to each other into a position preventing the adjustment of the shaft length or into a position allowing the adjustment of the shaft length where the spindle 6 can move in the sleeve 4 in the longitudinal direction. In this embodiment, the locking member 8 is attached to one end of the spindle 6 and taken through the lower part of the handle 16 provided in the upper shaft section as shown in FIGS. 1a and 4a. The user of the tool can easily turn the spindle 6 by means of the locking member 8 and thus manage the adjustment of the tool shaft length.

Furthermore, a limiter 36 is formed according to FIG. 2a between the toothing 12 and the locking member 8 at the spindle 6 end towards the locking nut 8. When the locking nut is turned, the limiter moves in a groove provided for it in the shaft section, preventing the spindle from turning around and defining the spindle position in which the shaft is in the adjustable position or in the locked position where the tool can be used. In that case, the groove provided in the shaft section and the limiter together define the rotational angle or area of the spindle, in which case it is advantageous to shape the groove such that the extreme points of the rotational area defined by it correspond to positions in which the spindle 6 is either in the locked position for use or in the adjustable position in which the spindle can move through the sleeve 4. According to the embodiment used as an example, the locking member 8 has two extreme positions. In the position shown in FIG. 1a, the locking member 8 and the spindle 6 are in a locked position where the shaft length cannot be adjusted, whereas in the position of the locking member 8 shown in FIG. 4a, the spindle 6 has been turned so as to allow it to move in the sleeve so that the shaft length can be adjusted. The locking member 8 can be attached to the spindle 6 by a hexagonal socket-head screw, bolt, thread or another similar system, or the locking member can also be made as an integral part of the spindle during manufacture.

In this embodiment, one end of the spindle 6 is provided with a collar portion 38, to which the locking member 8 is attached. The length of the collar portion 38 from the locking member 8 to the limiter 36 approximately corresponds to the length of the lead-through extending inside the shaft section 2 from the handle 16. Furthermore, both ends of the groove provided in the shaft section for the limiter 36 are provided with cavities in which the end of the limiter 36 fits in the extreme positions. When the collar section is slightly shorter than the lead-through so that stiffness is generated when the spindle 6 is turned, the cavities provided in the groove can be utilized. When the lead through is pressed between the locking member 8 and the limiter 36, the limiter end easily sinks into the cavities provided at the ends of the groove. In that case, the cavities form notches in the extreme positions, which help the spindle to stay in the locked position and in the position allowing the adjustment of the shaft length with respect to the sleeve. As a result, the spindle cannot accidentally turn when the tool is used, and the spindle also stays in the correct position during the adjustment of the shaft length.

FIGS. 1a to c and 2a to c illustrate an adjustable tool shaft according to the embodiment described above. The shaft comprises a handle 16, an outer shaft section 2, an inner shaft section 10 and adjusting means 4, 6, 8 for adjusting the shafts length. In this example, the spindle 6 is arranged in the tool shaft as follows: the locking member 8 attached to the first end of the spindle 6 is in the handle 16 as shown in FIGS. 1a and 4a, in which case the spindle is at the end of the outer shaft section 2 towards the handle and is taken inside the shaft through the opening provided at the locking nut 8. The sleeve 4 is attached to the end of the inner shaft section 2 towards the handle 16. The spindle 6 has been taken through the sleeve 4, which enables the adjustment of the shaft length according to the invention by turning the spindle in the sleeve by means of the locking member, in which case the tool shaft can be adjusted and it can be locked into the adjusted position for the use of the tool. In FIGS. 1a to c, the spindle 6 is in the locked position where it is held when the tool is used. In that case, the locking nut 8 is parallel with the handle as shown in FIG. 1a, and the spindle 6 going through the sleeve 4 is in a transverse position with respect to the sleeve 4 opening 34, preventing the spindle 6 from moving in the longitudinal direction and the shaft sections 2 and 10 from moving with respect to each other. In that case, the position of the locking member 8 does not cause any trouble to the tool user during use since it is like part of the handle 16 and thus unnoticeable.

When the shaft length is to be adjusted, the spindle 6 is turned by means of the locking member 8 into the position shown in FIGS. 4a to c, in which case the spindle 6 can move in the sleeve 4 opening 34. In that case, the shaft length is adjusted by pulling the shaft sections apart from each other in the longitudinal direction when the shaft is to be lengthened, and by pushing them towards each other in the longitudinal direction when the shaft is to be shortened, in which case the inner and the outer shaft section move telescopically with respect to each other. In this adjustable position, the locking member 8 is in the transverse position illustrated in FIG. 4a with respect to the handle 16 in a position which clearly hinders the use of the tool, preventing the user from accidentally using the tool when its shaft is in the adjustable position. Thus the adjusting mechanism prevents dangerous situations which may arise if the tool is used when the shaft is in the adjustable position. The position of the spindle 6 with respect to the sleeve 4 opening 34 is illustrated in the position preventing the shaft length adjustment and in the position allowing this in FIGS. 1c and 4a, respectively. As can be seen from FIG. 1c, in the locked position the spindle is in the transverse position in respect of the toothing 12 in relation to the sleeve 4 opening 34, and according to FIG. 4c, in the adjustable position the spindle is parallel with the sleeve 4 opening 34, which allows longitudinal movement of the spindle 6 in the opening 34.

The embodiment used as an example above can be modified in several ways within the scope of the invention. The locking member to be attached to one end of the spindle can be shaped in the desired manner and placed at a point deemed advantageous regardless of the tool. The locking member can also be made as an integral part of the spindle so that it cannot be detached from it. The handle or the tool portion of the instrument may also function as a locking nut such that the user may bring the tool shaft into the locked position and adjustable position by turning the handle or the tool portion, such as the blade portion of a shovel or the blade of a floorball stick. The locking member 8 can also be integrated into the tool handle or tool portion, in which case the user may turn the spindle 6 in the sleeve 4 by turning the handle or the tool portion. In an embodiment where the cross section of the shaft section is circular and the spindle and the sleeve are fixed to the shaft sections, the locking member is not necessarily needed but the spindle can be turned in the sleeve by turning the outer shaft section and the inner shaft section with respect to each other.

Depending on the manufacturing method, the spindle toothing can be formed of notches or grooves, for example, which are capable of performing the tasks of the toothing of the embodiment described above. The toothing may also consist of one row of successive cogs in the longitudinal direction which cover half of the spindle area, for example. The spindle toothing can also be implemented such that it is not even along the whole length of the spindle but the adjusting notches defined by the toothing may differ from one another in the longitudinal direction of the spindle. In that case, the adjusting notches are close to each other near the locking nut but the distance between them increases towards the other end of the spindle. Furthermore, the end flange or toothing provided at the spindle end towards the sleeve can be shaped into a proper flange which cannot be pulled out of the sleeve in any position. The flange can also be the kind of flange described above which substantially corresponds to the rest of the toothing but which is shaped so as to allow the spindle to be pulled completely out of the sleeve, if desired. The end flange can also be made of a separate part which is attached to the spindle end towards the sleeve by a screw, thread or the like.

The sleeve can be made as an integral part of the inner shaft section during manufacture. In a solution similar to the one described in the above example, the sleeve could thus be provided at the end of the inner shaft section towards the outer shaft section so that it resembles a separate sleeve. In this case, the sleeve could be a mere flange or the like formed at the end of the inner shaft section and provided with a suitably shaped opening for the spindle.

It will be obvious to a person skilled in the art that, as the technology advance, the inventive concept can be implemented in various ways. The invention and its embodiments are thus not limited to the examples described above but they may vary within the scope of the claims.

The invention claimed is:

1. A shaft of a tool with an adjustable length, the shaft comprising a first shaft section and a second shaft section which are attached to each other by adjusting means and are movable telescopically with respect to each other when the shaft length is adjusted, the adjusting means for adjusting the shaft length comprising a sleeve fixed to the second shaft section and having a flange with an opening and an at least partly toothed spindle fixed to the first shaft section and having several successive teeth along the spindle, the first end of the spindle being taken through the opening of the sleeve, the sleeve and the spindle attach the first and the second shaft section adjustably to each other so that the sleeve and the spindle can be turned with respect to each other into a position preventing the adjustment of the shaft length where the flange is tightened between a pair of successive teeth and into a position allowing the adjustment of the shaft length where the spindle can move in the opening of the flange of the sleeve in the longitudinal direction, the adjusting means also comprising a locking member by means of which the sleeve and the spindle can be turned with respect to each other into a position preventing the adjustment of the shaft length or into a position allowing the adjustment of the shaft length where the spindle can move in the sleeve in the longitudinal direction.

2. A shaft of a tool according to claim 1, wherein the tool further comprises a handle, the locking member being integrated into the handle.

3. A shaft of a tool according to claim 1, wherein the toothing of the spindle consists of successive cogs transverse to the longitudinal direction of the spindle, the cogs covering at least partly the outer surface of the spindle.

4. A shaft of a tool according to claim 3, wherein the toothing of the spindle consists of cog pairs which are transverse to the longitudinal direction of the spindle and match on the opposite sides of the spindle, in which case the areas between the opposite cog pairs of the spindle form a cog-free area which extends along most of the width of the spindle in the longitudinal direction.

5. A shaft of a tool according to claim 1, wherein the first end of the spindle is provided with an end flange which prevents the spindle from moving out of the opening of the flange of the sleeve when the shaft length is adjusted.

6. A shaft of a tool according to claim 5, wherein the end flange at the first end of the spindle has end toothing which is turned at an angle with respect to the rest of the toothing so as not to allow the spindle out of the sleeve when the shaft length is adjusted.

7. A shaft of a tool according to claim 1, wherein the spindle body is provided with a limiter, which moves in a groove provided in the shaft section, limiting the movement of the spindle when it is turned in the sleeve, such that the extreme positions of the limiter define the position preventing the length adjustment of the spindle and the position allowing the adjustment of the shaft length.

8. A shaft of a tool according to claim 1, wherein the second shaft section forms an inner shaft section, which moves telescopically inside an outer shaft section formed by the first shaft section when the shaft length is adjusted, in which case the sleeve is placed at the end of the second shaft section towards the first shaft section and the spindle is in the first shaft section.

9. A shaft of a tool according to claim 1, wherein the sleeve provided in the second shaft section is the flange.

10. A shaft of a tool according to claim 1, wherein the tool further comprises a tool portion, the locking member being integrated into the tool portion.

11. A shaft of a tool with an adjustable length, the shaft comprising a first shaft section and a second shaft section which are attached to each other by adjusting means and are movable telescopically with respect to each other when the shaft length is adjusted, the adjusting means for adjusting the shaft length comprising a sleeve fixed to the second shaft section and having a flange with an opening and an at least partly toothed spindle fixed to the first shaft section and having several successive teeth along the spindle, the first end of - the spindle being taken through the opening of the sleeve, the sleeve and the spindle attach the first and the second shaft section adjustably to each other so that the sleeve and the spindle can be turned with respect to each other into a position preventing the adjustment of the shaft length where the flange is tightened between a pair of successive teeth and into a position allowing the adjustment of the shaft length where the spindle can move in the opening of the flange of the sleeve in the longitudinal direction, wherein the spindle is provided with a limiter, which moves in a groove provided in the first shaft section, limiting the movement of the spindle when it is turned in the sleeve, such that the extreme positions of the limiter define the position preventing the length adjustment of the spindle and the position allowing the adjustment of the shaft length.

12. A shaft of a tool according to claim 11, wherein the adjusting means further comprise a locking member by means of which the sleeve and the spindle can be turned with respect to each other.

13. A shaft of a tool according to claim 12, wherein the tool further comprises a handle, the locking member being integrated into the handle.

14. A shaft of a tool according to claim 11, wherein the toothing of the spindle consists of successive cogs transverse to the longitudinal direction of the spindle, the cogs covering at least partly the outer surface of the spindle.

15. A shaft of a tool according to claim 14, wherein the toothing of the spindle includes cog pairs which are transverse to the longitudinal direction of the spindle and match on the opposite sides of the spindle, in which case the areas between the opposite cog pairs of the spindle form a cog-free area which extends along most of the width of the spindle in the longitudinal direction.

16. A shaft of a tool according to claim 11, wherein the first end of the spindle is provided with an end flange which prevents the spindle from moving out of the opening of the flange of the sleeve when the shaft length is adjusted.

17. A shaft of a tool according to claim 16, wherein the end flange at the first end of the spindle has end toothing which is turned at an angle with respect to the rest of the toothing so as not to allow the spindle out of the sleeve when the shaft length is adjusted.

18. A shaft of a tool according to claim 11, wherein the second shaft section forms an inner shaft section, which moves telescopically inside an outer shaft section formed by the first shaft section when the shaft length is adjusted, in which case the sleeve is placed at the end of the second shaft section towards the first shaft section and the spindle is in the first shaft section.

19. A shaft of a tool according to claim 12, wherein the tool further comprises a tool portion, the locking member being integrated into the tool portion.

* * * * *